US008904893B2

(12) United States Patent
Moorman et al.

(10) Patent No.: US 8,904,893 B2
(45) Date of Patent: *Dec. 9, 2014

(54) METHOD OF CONTROLLING A DUAL CLUTCH TRANSMISSION

(75) Inventors: Steven P. Moorman, Dexter, MI (US); Philip C. Lundberg, Keego Harbor, MI (US); John R. Czoykowski, Grosse Pointe Park, MI (US); Bret M. Olson, Whitelake, MI (US); Chinar S. Ghike, Livonia, MI (US); James D. Hendrickson, Oxford, MI (US); Christopher Jay Weingartz, Holly, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 676 days.

This patent is subject to a terminal disclaimer.

(21) Appl. No.: 13/174,160

(22) Filed: Jun. 30, 2011

(65) Prior Publication Data

US 2012/0137806 A1      Jun. 7, 2012

Related U.S. Application Data

(60) Provisional application No. 61/420,153, filed on Dec. 6, 2010.

(51) Int. Cl.
*F16H 3/38* (2006.01)
*F16H 61/02* (2006.01)
*F16H 61/30* (2006.01)
*F16H 61/688* (2006.01)

(52) U.S. Cl.
CPC ............ *F16H 61/0206* (2013.01); *F16H 61/30* (2013.01); *F16H 61/688* (2013.01)
USPC ................. 74/335; 74/340; 192/3.58; 701/60

(58) Field of Classification Search
USPC .......... 74/330, 331, 335, 340; 192/3.57, 3.58; 477/161, 155; 701/60
See application file for complete search history.

(56) References Cited

U.S. PATENT DOCUMENTS

| | | | | | |
|---|---|---|---|---|---|
| 2,924,111 | A | * | 2/1960 | Backus | 74/336.5 |
| 3,078,673 | A | * | 2/1963 | Browning et al. | 60/417 |
| 3,774,475 | A | | 11/1973 | Meysenburg et al. | |
| 3,834,499 | A | | 9/1974 | Candellero et al. | |
| 4,361,060 | A | * | 11/1982 | Smyth | 477/78 |
| 4,476,748 | A | * | 10/1984 | Morscheck | 477/122 |

(Continued)

FOREIGN PATENT DOCUMENTS

| | | |
|---|---|---|
| EP | 1469235 A1 | 10/2004 |
| EP | 1519082 A1 | 3/2005 |

(Continued)

*Primary Examiner* — William Kelleher
*Assistant Examiner* — Valentin Craciun (57) ABSTRACT

A method of controlling a hydraulic control system for a dual clutch transmission includes controlling a plurality of pressure and flow control devices in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

19 Claims, 6 Drawing Sheets

(56) References Cited

U.S. PATENT DOCUMENTS

| | | | |
|---|---|---|---|
| 4,589,295 A | 5/1986 | Jerry et al. | |
| 4,589,532 A * | 5/1986 | Ito et al. | 477/81 |
| 4,653,352 A | 3/1987 | Nakao et al. | |
| 4,924,983 A * | 5/1990 | Katayama et al. | 192/52.4 |
| 4,944,202 A | 7/1990 | Gierer | |
| 5,224,392 A * | 7/1993 | Hutchison et al. | 74/335 |
| 5,240,093 A * | 8/1993 | Wagner et al. | 192/3.58 |
| 5,441,459 A | 8/1995 | Inukai et al. | |
| 5,813,940 A | 9/1998 | Ramm et al. | |
| 5,836,207 A * | 11/1998 | Spooner et al. | 74/335 |
| 5,950,781 A | 9/1999 | Adamis et al. | |
| 5,966,989 A | 10/1999 | Reed, Jr. et al. | |
| 5,992,590 A * | 11/1999 | Harries | 192/3.58 |
| 6,361,287 B1 | 3/2002 | Hopper | |
| 6,626,056 B2 * | 9/2003 | Ulm et al. | 74/335 |
| 6,631,651 B2 * | 10/2003 | Petrzik | 74/346 |
| 6,675,668 B2 | 1/2004 | Schamscha | |
| 6,698,304 B2 | 3/2004 | Gierling et al. | |
| 6,715,597 B1 | 4/2004 | Buchanan et al. | |
| 6,789,658 B2 * | 9/2004 | Busold et al. | 192/103 F |
| 6,827,191 B2 | 12/2004 | Kuhstrebe | |
| 6,883,394 B2 | 4/2005 | Koenig et al. | |
| 6,935,204 B2 * | 8/2005 | Walker et al. | 74/335 |
| 6,941,830 B2 | 9/2005 | Ibamoto et al. | |
| 6,953,417 B2 * | 10/2005 | Koenig | 477/181 |
| 7,044,013 B2 | 5/2006 | Ahrens | |
| 7,048,672 B2 | 5/2006 | Bothe et al. | |
| 7,073,407 B2 * | 7/2006 | Stefina | 74/331 |
| 7,127,961 B2 * | 10/2006 | Braford et al. | 74/340 |
| 7,155,993 B2 * | 1/2007 | Koenig et al. | 74/331 |
| 7,188,540 B2 * | 3/2007 | Taylor | 74/335 |
| 7,300,375 B2 * | 11/2007 | Petrzik | 475/119 |
| 7,401,689 B2 * | 7/2008 | Hegerath et al. | 192/3.58 |
| 7,464,617 B2 | 12/2008 | Baldascini et al. | |
| 7,464,618 B2 * | 12/2008 | Mohlmann et al. | 74/346 |
| 7,464,628 B2 | 12/2008 | Shinohara et al. | |
| 7,472,616 B2 | 1/2009 | Dreher et al. | |
| 7,478,572 B2 | 1/2009 | Maten et al. | |
| 7,487,866 B2 * | 2/2009 | Kruse et al. | 192/113.3 |
| 7,575,533 B2 | 8/2009 | Gumpoltsberger | |
| 7,591,203 B2 | 9/2009 | Ochi et al. | |
| 7,608,008 B2 | 10/2009 | Seo | |
| 7,621,840 B2 | 11/2009 | Kamm et al. | |
| 7,856,999 B2 * | 12/2010 | Xiang et al. | 137/118.02 |
| 8,192,176 B2 * | 6/2012 | Lundberg et al. | 417/307 |
| 8,206,265 B2 * | 6/2012 | Maten et al. | 477/130 |
| 8,225,687 B2 * | 7/2012 | Lundberg et al. | 74/330 |
| 8,234,946 B2 * | 8/2012 | Momal et al. | 74/330 |
| 8,356,529 B2 * | 1/2013 | Lundberg et al. | 74/340 |
| 8,359,941 B2 * | 1/2013 | Lundberg et al. | 74/340 |
| 8,376,906 B2 * | 2/2013 | Koenig et al. | 477/5 |
| 8,382,639 B2 * | 2/2013 | Moses et al. | 477/70 |
| 8,402,855 B2 * | 3/2013 | Lundberg et al. | 74/335 |
| 8,403,792 B2 * | 3/2013 | Lundberg et al. | 475/128 |
| 8,413,777 B2 * | 4/2013 | Lundberg et al. | 192/3.58 |
| 8,429,994 B2 * | 4/2013 | Lundberg et al. | 74/335 |
| 8,430,220 B2 * | 4/2013 | Lundberg et al. | 192/3.58 |
| 8,434,603 B2 * | 5/2013 | Lundberg et al. | 192/3.58 |
| 8,443,687 B2 * | 5/2013 | Moorman | 74/335 |
| 8,443,956 B2 * | 5/2013 | Bauer et al. | 192/85.61 |
| 8,475,336 B2 * | 7/2013 | Whitmarsh et al. | 477/79 |
| 8,528,711 B2 * | 9/2013 | Czoykowski et al. | 192/3.58 |
| 8,567,580 B2 * | 10/2013 | Czoykowski et al. | 192/3.58 |
| 8,578,764 B2 * | 11/2013 | Stefina | 73/115.02 |
| 8,590,684 B2 * | 11/2013 | Czoykowski et al. | 192/3.58 |
| 2001/0036878 A1 | 11/2001 | Itou et al. | |
| 2002/0002878 A1 * | 1/2002 | Petrzik | 74/730.1 |
| 2002/0060113 A1 | 5/2002 | Harries | |
| 2002/0119864 A1 | 8/2002 | Harries | |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |
| 2004/0069082 A1 * | 4/2004 | Koenig et al. | 74/335 |
| 2004/0166987 A1 * | 8/2004 | Buchanan et al. | 477/70 |
| 2004/0166990 A1 * | 8/2004 | Buchanan et al. | 477/174 |
| 2004/0172184 A1 * | 9/2004 | Vukovich et al. | 701/51 |
| 2005/0067251 A1 | 3/2005 | Braford, Jr. et al. | |
| 2005/0107214 A1 * | 5/2005 | Koenig | 477/174 |
| 2005/0272559 A1 | 12/2005 | Bothe et al. | |
| 2006/0005647 A1 * | 1/2006 | Braford et al. | 74/335 |
| 2006/0006042 A1 * | 1/2006 | Koenig | 192/113.3 |
| 2006/0006043 A1 * | 1/2006 | Koenig et al. | 192/113.3 |
| 2006/0009326 A1 * | 1/2006 | Stefina | 477/127 |
| 2006/0011007 A1 * | 1/2006 | Taylor | 74/473.11 |
| 2007/0175726 A1 | 8/2007 | Combes et al. | |
| 2008/0108472 A1 | 5/2008 | Seo | |
| 2008/0108474 A1 | 5/2008 | Seo | |
| 2008/0207392 A1 | 8/2008 | Staudinger et al. | |
| 2008/0210032 A1 * | 9/2008 | Uberti et al. | 74/335 |
| 2008/0223683 A1 * | 9/2008 | Grethel | 192/87.13 |
| 2008/0234093 A1 | 9/2008 | Diosi et al. | |
| 2008/0242493 A1 | 10/2008 | Carey et al. | |
| 2008/0305911 A1 | 12/2008 | Moorman et al. | |
| 2009/0000897 A1 * | 1/2009 | Staudinger et al. | 192/48.1 |
| 2009/0017963 A1 | 1/2009 | Hart et al. | |
| 2009/0048061 A1 | 2/2009 | Hart et al. | |
| 2009/0071545 A1 * | 3/2009 | Xiang et al. | 137/118.02 |
| 2009/0151495 A1 * | 6/2009 | Garabello et al. | 74/473.11 |
| 2009/0157271 A1 * | 6/2009 | Garabello et al. | 701/55 |
| 2009/0221394 A1 | 9/2009 | Phillips et al. | |
| 2009/0247351 A1 | 10/2009 | Seo et al. | |
| 2010/0099537 A1 * | 4/2010 | Maten et al. | 477/130 |
| 2010/0190606 A1 * | 7/2010 | Moses et al. | 477/168 |
| 2011/0028271 A1 * | 2/2011 | Whitmarsh et al. | 477/86 |
| 2011/0042177 A1 * | 2/2011 | Bauer et al. | 192/85.61 |
| 2011/0056314 A1 * | 3/2011 | Lundberg et al. | 74/473.11 |
| 2011/0056315 A1 * | 3/2011 | Lundberg et al. | 74/473.11 |
| 2011/0056316 A1 * | 3/2011 | Lundberg et al. | 74/473.11 |
| 2011/0077122 A1 * | 3/2011 | Lundberg et al. | 477/130 |
| 2011/0092335 A1 * | 4/2011 | Lundberg et al. | 477/79 |
| 2011/0132711 A1 * | 6/2011 | Czoykowski et al. | 192/48.601 |
| 2011/0132716 A1 * | 6/2011 | Czoykowski et al. | 192/85.01 |
| 2011/0138956 A1 * | 6/2011 | Moorman | 74/473.11 |
| 2011/0139279 A1 * | 6/2011 | Lundberg et al. | 137/565.11 |
| 2011/0139564 A1 * | 6/2011 | Czoykowski et al. | 192/48.601 |
| 2011/0168510 A1 * | 7/2011 | Lundberg et al. | 192/3.51 |
| 2011/0180364 A1 * | 7/2011 | Czoykowski et al. | 192/85.63 |
| 2011/0198178 A1 * | 8/2011 | Lundberg et al. | 192/3.57 |
| 2011/0198180 A1 * | 8/2011 | Momal et al. | 192/3.58 |
| 2011/0203361 A1 * | 8/2011 | Stefina | 73/115.02 |
| 2011/0237388 A1 * | 9/2011 | Koenig et al. | 477/5 |
| 2011/0297499 A1 * | 12/2011 | Lundberg et al. | 192/3.57 |
| 2012/0079905 A1 * | 4/2012 | Frait et al. | 74/473.11 |
| 2012/0138406 A1 * | 6/2012 | Lundberg et al. | 192/3.58 |
| 2012/0138408 A1 * | 6/2012 | Moorman et al. | 192/48.601 |
| 2012/0138413 A1 * | 6/2012 | Moorman et al. | 192/85.62 |
| 2012/0144946 A1 * | 6/2012 | Lundberg et al. | 74/473.11 |
| 2012/0145502 A1 * | 6/2012 | Moorman et al. | 192/3.58 |
| 2012/0145503 A1 * | 6/2012 | Moorman et al. | 192/3.58 |
| 2012/0145504 A1 * | 6/2012 | Moorman et al. | 192/3.58 |
| 2012/0168274 A1 * | 7/2012 | Mills | 192/85.63 |

FOREIGN PATENT DOCUMENTS

| | | |
|---|---|---|
| EP | 1589262 A1 | 10/2005 |
| GB | 2415022 | 7/2007 |
| WO | WO9919644 A1 | 4/1999 |
| WO | WO2004076225 A1 | 9/2004 |
| WO | WO2004097265 A1 | 11/2004 |
| WO | WO2005078319 A1 | 8/2005 |
| WO | WO2007017012 A1 | 2/2007 |
| WO | WO2009048649 A2 | 4/2009 |

* cited by examiner

METHOD OF CONTROLLING A DUAL CLUTCH TRANSMISSION

RELATED APPLICATION

This application claims the benefit of U.S. Provisional Application No. 61/420,153, filed Dec. 6, 2010. The entire contents of the above application are incorporated herein by reference.

TECHNICAL FIELD

The invention relates to a method of controlling a dual clutch transmission, and more particularly to a method of controlling an electro-hydraulic control system having a plurality of solenoids operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A method of controlling a hydraulic control system for a dual clutch transmission includes controlling a plurality of pressure and flow control devices in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the pressure control solenoids and the flow control solenoids allows for a pressurized fluid to activate at least one of the clutch actuators and synchronizer actuators in order to shift the transmission into a desired gear ratio.

In one example, the method includes controlling an electric pump and an accumulator that provide a pressurized hydraulic fluid.

In another example, the method includes controlling two pressure control devices and two flow control devices used to actuate the dual clutch.

In yet another example, the method includes controlling one pressure control device and four flow control devices used to actuate the plurality of synchronizer assemblies.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
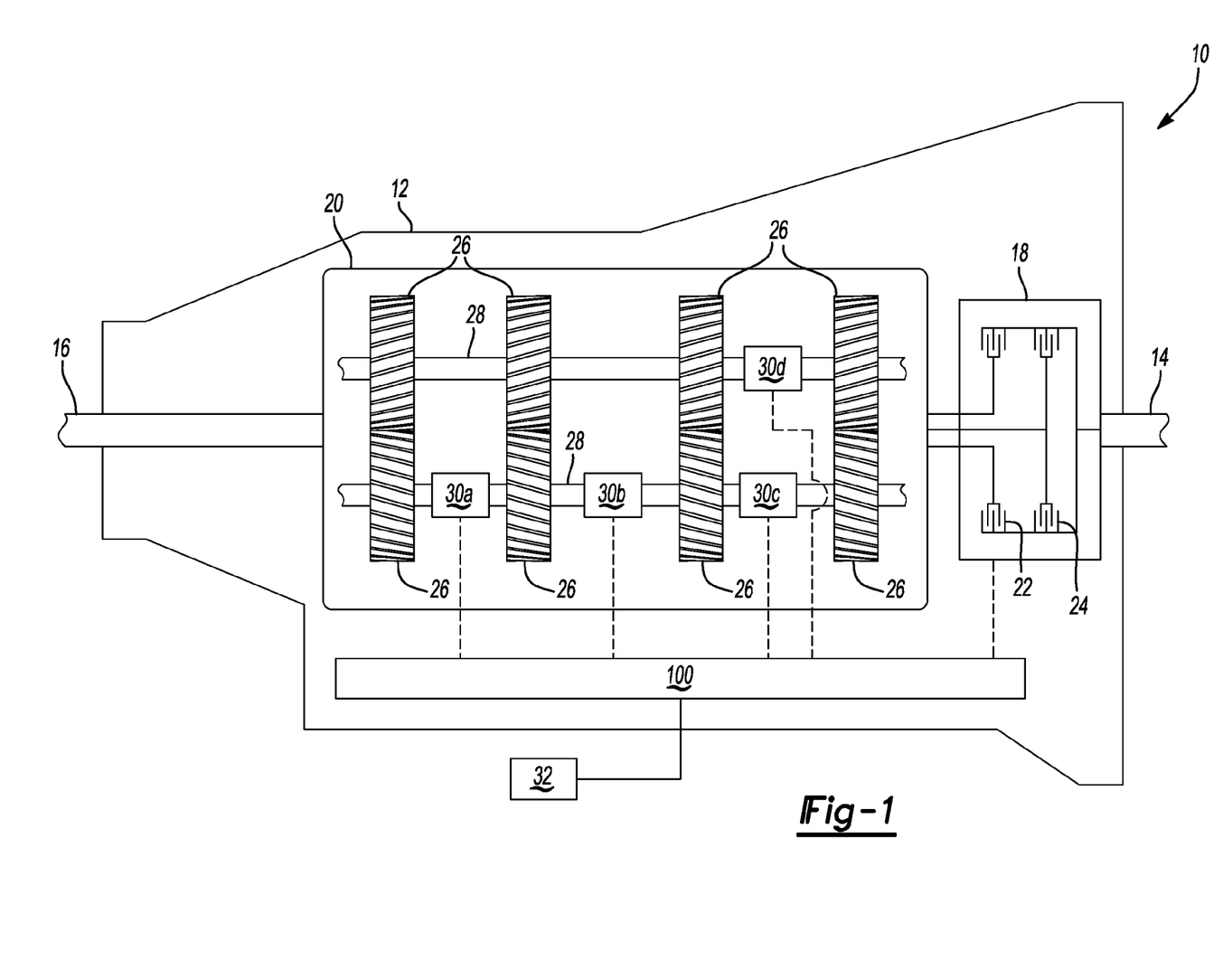
FIG. 1 is a schematic diagram of an exemplary dual clutch transmission having a hydraulic control system in accordance with the principles of the present invention.

With reference to FIG. 1, an exemplary dual clutch automatic transmission incorporating the present invention is illustrated and generally designated by the reference number 10. At the outset it should be appreciated that the transmission 10 is illustrated schematically in order to generally indicate some of the components of the transmission 10. It should be appreciated that the illustration of the transmission 10 is not intended to be limiting to the configuration shown. The dual clutch transmission 10 includes a typically cast, metal housing 12 which encloses and protects the various components of the transmission 10. The housing 12 includes a variety of apertures, passageways, shoulders and flanges which position and support these components. While the housing 12 is illustrated as a typical rear wheel drive transmission, it should be appreciated that the transmission 10 may be a front wheel drive transmission or a rear wheel drive transmission without departing from the scope of the present invention. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention. In the example provided, the transmission 10 provides seven forward gears and a reverse gear.

The gear arrangement 20 further includes a first synchronizer assembly 30A, a second synchronizer assembly 30B, a third synchronizer assembly 30C, and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The synchronizer positively connects or couples the gear to the shaft. The synchronizer actuator is bi-directionally translated by a shift rail and fork assembly (not shown) within each synchronizer assembly 30A-D. In certain arrangements two single-sided synchronizers can be used in place of a double-sided synchronizer without departing from scope of the invention.

The transmission also includes a transmission control module 32. The transmission control module (TCM) 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention. It should be appreciated that the transmission control module 32 may be integrated into other existing controllers without departing from the scope of the present invention.

Figure 2A:
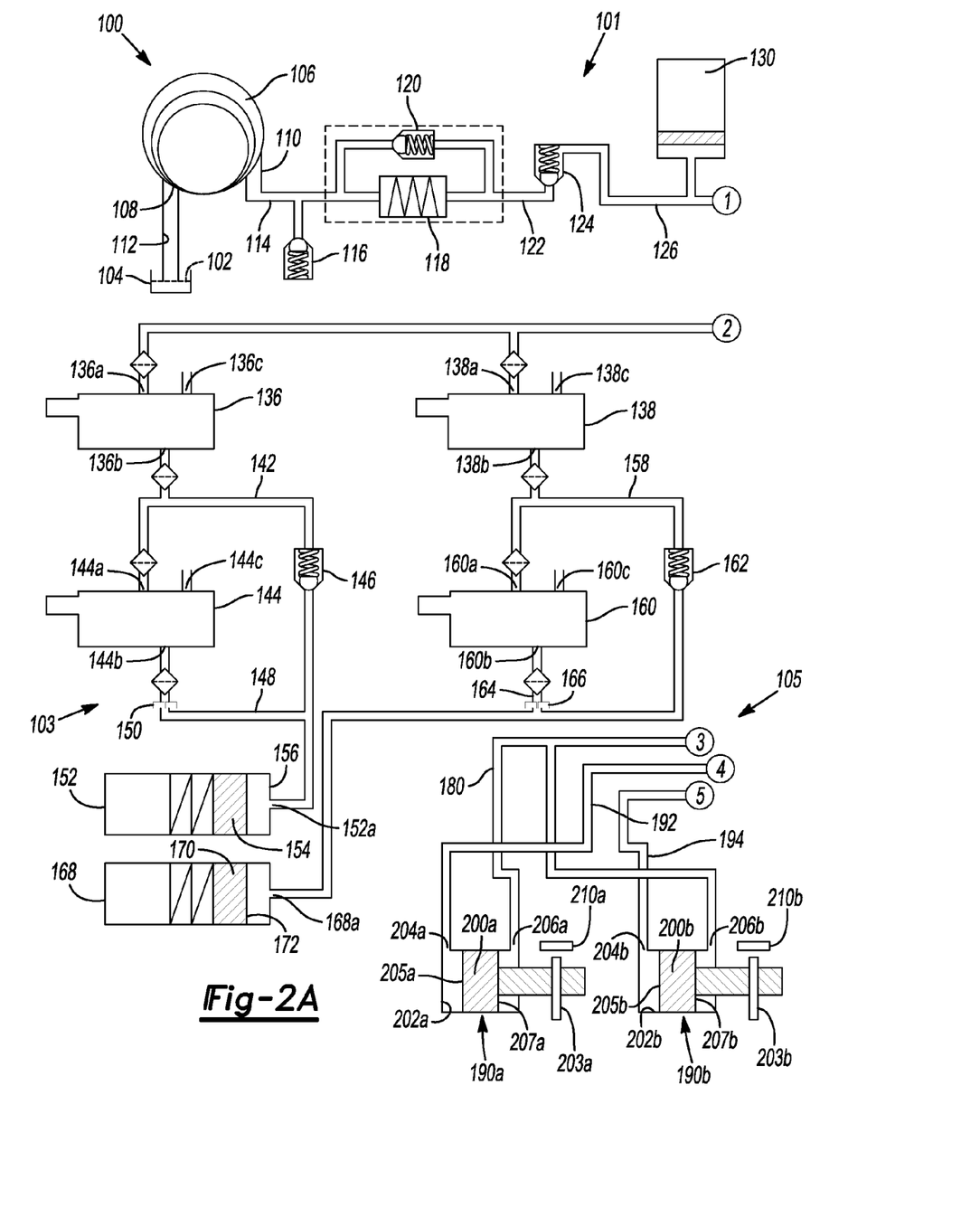
FIGS. 2A and 2B are schematic diagrams of an embodiment of a hydraulic control system for a dual clutch transmission in accordance with the principles of the present invention.
Figure 2B:
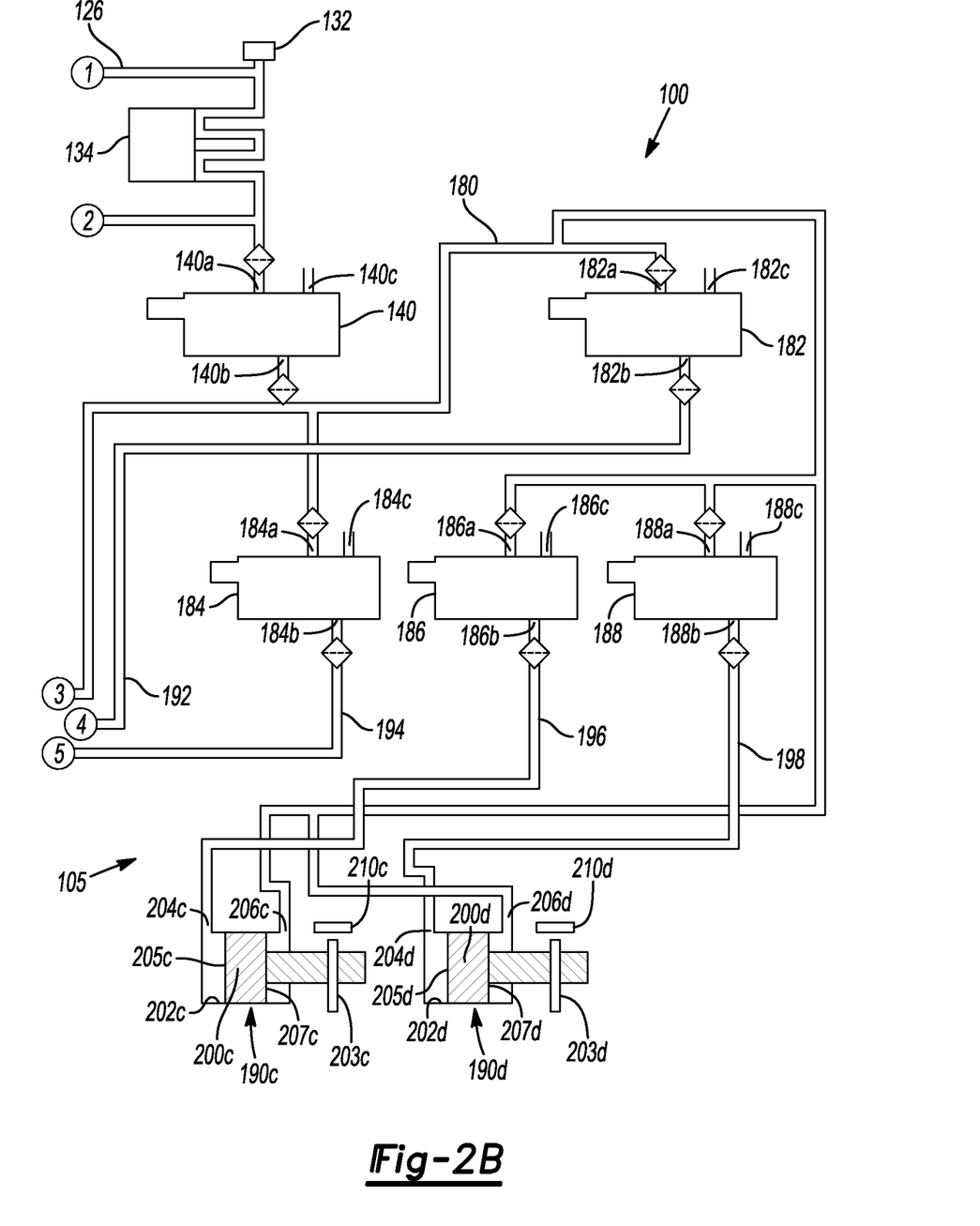

Turning to FIG. 2, the hydraulic control system 100 of the present invention is operable to selectively engage the dual clutch assembly 18 and the synchronizer assemblies 30A-D by selectively communicating a hydraulic fluid 102 from a sump 104 to a plurality of shift actuating devices, as will be described in greater detail below. The sump 104 is a tank or reservoir to which the hydraulic fluid 104 returns and collects from various components and regions of the automatic transmission 10. The hydraulic fluid 102 is forced from the sump 104 via a pump 106. The pump 106 is preferably driven by an electric engine (not shown) or any other type of prime mover and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106 when the pressure in line 122 is less than line 126. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32.

The main supply line 126 is channeled through a heat sink 134 used to cool the controller 32, though it should be appreciated that the heat sink 134 may be located elsewhere or removed from the hydraulic control system 100 without departing from the scope of the present invention. The main supply line 126 supplies pressurized hydraulic fluid 102 to three pressure control devices including a first clutch pressure control device 136, a second clutch pressure control device 138, and an actuator pressure control device 140.

The first clutch pressure control device 136 is preferably an electrically controlled variable force solenoid having an internal closed loop pressure control. Various makes, types, and models of solenoids may be employed with the present invention so long as the first clutch pressure control device 136 is operable to control the pressure of the hydraulic fluid 102. The first clutch pressure control device 136 includes an inlet port 136A that communicates with an outlet port 136B when the first clutch pressure control device 136 is activated or energized and includes an exhaust port 136C that communicates with the outlet port 136B when the first clutch pressure control device 136 is inactive or de-energized. Variable activation of the first clutch pressure control device 136 regulates or controls the pressure of the hydraulic fluid 102 as the hydraulic fluid 102 communicates from the inlet port 136A to the outlet port 136B. The internal closed loop pressure control provides pressure feedback within the solenoid to adjust the amount of flow to the outlet port 136B based on a particular current command from the controller 32, thereby controlling pressure. The inlet port 136A is in communication with the main supply line 126. The outlet port 136B is in communication with an intermediate line 142. The exhaust port 136C is in communication with the sump 104 or an exhaust backfill circuit (not shown).

The intermediate line 142 communicates the hydraulic fluid 102 from the first clutch pressure control device 136 to a first clutch flow control device 144 and to a first pressure limit control valve 146. The first clutch flow control device 144 is preferably an electrically controlled variable force solenoid that is operable to control a flow of the hydraulic fluid 102 from the first clutch flow control device 144 in order to actuate the first torque transmitting device 22, as will be described in greater detail below. The first clutch flow control device 144 includes an inlet port 144A that communicates with an outlet port 144B when the first clutch flow control device 144 is energized to a current greater than the null point current (i.e. the current at the zero forward/reverse flow point) and includes an exhaust port 144C that communicates with the outlet port 144B when the first clutch flow control device 144 is de-energized to a current less than the null point current. Variable activation of the first clutch flow control device 144 regulates or controls the flow of the hydraulic fluid 102 as the hydraulic fluid 102 communicates from the inlet port 144A to the outlet port 144B. The inlet port 144A is in communication with the intermediate line 142. The outlet port 144B is in communication with a first clutch supply line 148 and a flow restriction orifice 150 (which may or may not be present). The exhaust port 144C is in communication with the sump 104. The first pressure limit control valve 146 is disposed in parallel with the first clutch flow control solenoid 144 and is in communication with the first clutch supply line 148. If pressure within the first clutch supply line 148 exceeds a predetermined value above intermediate line 142, the first pressure limit control valve 146 opens to relieve and reduce the pressure. Pressure limit control valve 146 and the corresponding parallel branch may be removed from the circuit if the functionality is not required and therefore does not depart from the scope of the invention.

The first clutch supply line 148 is in fluid communication with an inlet/outlet port 152A in a first clutch piston assembly 152. The first clutch piston assembly 152 includes a single acting piston 154 slidably disposed in a cylinder 156. The piston 154 translates under hydraulic pressure to engage the first torque transmitting device 22, shown in FIG. 1. When the first clutch flow control device 144 is activated or energized, a flow of pressurized hydraulic fluid 102 is provided to the first clutch supply line 148. The flow of pressurized hydraulic fluid 102 is communicated from the first clutch supply line 148 to the first clutch piston assembly 152 where the pressurized hydraulic fluid 102 translates the piston 154, thereby engaging the first torque transmitting device 22. When the first clutch flow control solenoid 144 is de-energized, the inlet port 144A is closed and hydraulic fluid from the cylinder 156 passes from the outlet port 144B to the exhaust port 144C and into the sump 104, thereby disengaging the first torque transmitting device 22. The translation of the piston 154 may be measured by a position sensor (not shown) for active control of the first torque transmitting device 22.

The second clutch pressure control device 138 is preferably an electrically controlled variable force solenoid having an internal closed loop pressure control. Various makes, types, and models of solenoids may be employed with the present invention so long as the second clutch pressure control device 138 is operable to control the pressure of the hydraulic fluid 102. The second clutch pressure control device 138 includes an inlet port 138A that communicates with an outlet port 138B when the second clutch pressure control device 138 is activated or energized and includes an exhaust port 138C that communicates with the outlet port 138B when the second clutch pressure control device 138 is inactive or de-energized. Variable activation of the second clutch pressure control device 138 regulates or controls the pressure of the hydraulic fluid 102 as the hydraulic fluid 102 communicates from the inlet port 138A to the outlet port 138B. The internal closed loop pressure control provides pressure feedback within the solenoid to adjust the amount of flow to the outlet port 138B based on a particular current command from the controller 32, thereby controlling pressure. The inlet port 138A is in communication with the main supply line 126. The outlet port 138B is in communication with an intermediate line 158. The exhaust port 138C is in communication with the sump 104 or an exhaust backfill circuit (not shown).

The intermediate line 158 communicates the hydraulic fluid 102 from the second clutch pressure control device 138 to a second clutch flow control device 160 and to a second pressure limit control valve 162. The second clutch flow control device 160 is preferably an electrically controlled variable force solenoid that is operable to control a flow of the hydraulic fluid 102 from the second clutch flow control device 160 in order to actuate the second torque transmitting device 24, as will be described in greater detail below. The second clutch flow control device 160 includes an inlet port 160A that communicates with an outlet port 160B when the second clutch flow control device 160 is energized to a current greater than the null point current and includes an exhaust port 160C that communicates with the outlet port 160B when the second clutch flow control device 160 is de-energized to a current less than the null point current. Variable activation of the second clutch flow control device 160 regulates or controls the flow of the hydraulic fluid 102 as the hydraulic fluid 102 communicates from the inlet port 160A to the outlet port 160B. The inlet port 160A is in communication with the intermediate line 158. The outlet port 160B is in communication with a second clutch supply line 164 and a flow restriction orifice 166 (which may or may not be present). The exhaust port 160C is in communication with the sump 104 or a backfill circuit. The second pressure limit control valve 162 is disposed in parallel with the second clutch flow control solenoid 160 and is in communication with the second clutch supply line 164. If pressure within the second clutch supply line 164 exceeds a predetermined value above intermediate line 158, the second pressure limit control valve 162 opens to relieve and reduce the pressure.

The second clutch supply line 164 is in fluid communication with an inlet/outlet port 168A in a second clutch piston assembly 168. The second clutch piston assembly 168 includes a single acting piston 170 slidably disposed in a cylinder 172. The piston 170 translates under hydraulic pressure to engage the second torque transmitting device 24, shown in FIG. 1. When the second clutch flow control device 160 is activated or energized, a flow of pressurized hydraulic fluid 102 is provided to the second clutch supply line 164. The flow of pressurized hydraulic fluid 102 is communicated from the second clutch supply line 164 to the second clutch piston assembly 168 where the pressurized hydraulic fluid 102 translates the piston 170, thereby engaging the second torque transmitting device 24. When the second clutch flow control solenoid 160 is de-energized, the inlet port 160A is closed and hydraulic fluid from the cylinder 172 passes from the outlet port 160B to the exhaust port 160C and into the sump 104, thereby disengaging the second torque transmitting device 24. The translation of the piston 170 may be measured by a position sensor (not shown) for active control of transmitting device 24.

The actuator pressure control device 140 is preferably an electrically controlled variable force solenoid having an internal closed loop pressure control. Various makes, types, and models of solenoids may be employed with the present invention so long as the actuator pressure control device 140 is operable to control the pressure of the hydraulic fluid 102. The actuator pressure control device 140 includes an inlet port 140A that communicates with an outlet port 140B when the actuator pressure control device 140 is activated or energized and includes an exhaust port 140C that communicates with the outlet port 140B when the actuator pressure control device 140 is inactive or de-energized. Variable activation of the actuator pressure control device 140 regulates or controls the pressure of the hydraulic fluid 102 as the hydraulic fluid 102 communicates from the inlet port 140A to the outlet port 140B. The internal closed loop pressure control provides pressure feedback within the solenoid to adjust the amount of flow to the outlet port 140B based on a particular current command from the controller 32, thereby controlling pressure. The inlet port 140A is in communication with the main supply line 126. The outlet port 140B is in communication with an actuator supply line 180. The exhaust port 140C is in communication with the sump 104 or a backfill circuit.

The actuator supply line 180 communicates pressurized hydraulic fluid 102 from the actuator pressure control device 140 to a plurality of flow control devices and a plurality of shift actuators. For example, the actuator supply line 180 provides a flow of pressurized hydraulic fluid 102 to a first flow control device 182, a second flow control device 184, a third flow control device 186, a fourth flow control device 188, as well as a first synchronizer actuator 190A, a second synchronizer actuator 190B, a third synchronizer actuator 190C, and a fourth synchronizer actuator 190D.

The first flow control device 182 is preferably an electrically controlled variable force solenoid. Various makes, types, and models of solenoids may be employed with the present invention so long as the first flow control device 182 is operable to control the flow of the hydraulic fluid 102. The first flow control device 182 includes an inlet port 182A that communicates through an adjustable hydraulic orifice or restriction with an outlet port 182B when the first flow control device 182 is energized to a current greater than the null point current and includes an exhaust port 182C that communicates with the outlet port 182B when the first flow control device 182 is de-energized to a current less than the null point current. Variable activation of the first flow control device 182 regulates or controls the flow of the hydraulic fluid 102 as the hydraulic fluid 102 communicates from the inlet port 182A to the outlet port 182B or from outlet port 182B to exhaust port 182C. The inlet port 182A is in communication with the actuator supply line 180. The outlet port 182B is in communication with a first synchronizer supply line 192. The exhaust port 182C is in communication with the sump 104 or an exhaust backfill circuit.

The second flow control device 184 is preferably an electrically controlled variable force solenoid. Various makes, types, and models of solenoids may be employed with the present invention so long as the second flow control device 184 is operable to control the flow of the hydraulic fluid 102. The second flow control device 184 includes an inlet port 184A that communicates through an adjustable hydraulic orifice or restriction with an outlet port 184B when the second flow control device 184 is energized to a current greater than the null point current and includes an exhaust port 184C that communicates with the outlet port 184B when the second flow control device 184 is de-energized to a current less than the null point current. Variable activation of the second flow control device 184 regulates or controls the flow of the hydraulic fluid 102 as the hydraulic fluid 102 communicates from the inlet port 184A to the outlet port 184B or from outlet port 184B to exhaust port 184C. The inlet port 184A is in communication with the actuator supply line 180. The outlet port 184B is in communication with a second synchronizer supply line 194. The exhaust port 184C is in communication with the sump 104 or an exhaust backfill circuit.

The third flow control device 186 is preferably an electrically controlled variable force solenoid. Various makes, types, and models of solenoids may be employed with the present invention so long as the third flow control device 186 is operable to control the flow of the hydraulic fluid 102. The third flow control device 186 includes an inlet port 186A that communicates through an adjustable hydraulic orifice or restriction with an outlet port 186B when the third flow control device 186 is energized to a current greater than the null point current and includes an exhaust port 186C that communicates with the outlet port 186B when the third flow control device 186 is de-energized to a current less than the null point current. Variable activation of the third flow control device 186 regulates or controls the flow of the hydraulic fluid 102 as the hydraulic fluid 102 communicates from the inlet port 186A to the outlet port 186B or from outlet port 186B to exhaust port 186C. The inlet port 186A is in communication with the actuator supply line 180. The outlet port 186B is in communication with a third synchronizer supply line 196. The exhaust port 186C is in communication with the sump 104 or an exhaust backfill circuit.

The fourth flow control device 188 is preferably an electrically controlled variable force solenoid. Various makes, types, and models of solenoids may be employed with the present invention so long as the fourth flow control device 188 is operable to control the flow of the hydraulic fluid 102. The fourth flow control device 188 includes an inlet port 188A that communicates through an adjustable hydraulic orifice or restriction with an outlet port 188B when the fourth flow control device 188 is energized to a current greater than the null point current and includes an exhaust port 188C that communicates with the outlet port 188B when the fourth flow control device 188 is de-energized to a current less than the null point current. Variable activation of the fourth flow control device 188 regulates or controls the flow of the hydraulic fluid 102 as the hydraulic fluid 102 communicates from the inlet port 188A to the outlet port 188B or from outlet port 188B to exhaust port 188C. The inlet port 188A is in communication with the actuator supply line 180. The outlet port 188B is in communication with a fourth synchronizer supply line 198. The exhaust port 188C is in communication with the sump 104 or an exhaust backfill circuit.

The synchronizer actuators 190A-D are preferably two-area piston assemblies operable to each engage or actuate a shift rail in a synchronizer assembly, but can be three-area piston assemblies without departing from the scope of the present invention. For example, the first synchronizer actuator 190A is operable to actuate the first synchronizer assembly 30A, the second synchronizer actuator 190B is operable to actuate the second synchronizer assembly 30B, the third synchronizer actuator 190C is operable to actuate the third synchronizer assembly 30C, and the fourth synchronizer actuator 190D is operable to actuate the fourth synchronizer assembly 30D.

The first synchronizer actuator 190A includes a piston 200A slidably disposed within a piston housing or cylinder 202A. The piston 200A presents two separate areas for pressurized hydraulic fluid to act upon. The piston 200A engages or contacts a finger lever, shift fork, or other shift rail component 203A of the first synchronizer assembly 30A. The first synchronizer actuator 190A includes a fluid port 204A that communicates with a first end 205A of the piston 200A and a fluid port 206A that communicates with an opposite second end 207A of the piston 200A having a smaller contact area than the first end 205A. Fluid port 204A is in communication with the first synchronizer supply line 192 and fluid port 206A is in communication with the actuator supply line 180. Accordingly, the pressurized hydraulic fluid 102 communicated from the actuator pressure control device 140 enters the first synchronizer actuator 190A through the fluid port 206A and contacts the second end 207A of the piston 200A and the flow of hydraulic fluid 102 from the first flow control device 182 enters the first synchronizer actuator 190A through the fluid port 204A and contacts the first end 205A of the piston 200A. The difference in the force generated by the pressure of the hydraulic fluid 102 delivered to fluid port 206A from the actuator pressure control device 140 acting on end 207A and the force generated by the pressure of hydraulic fluid 102 delivered to fluid port 204A from the first flow control device 182 acting on end 205A moves the piston 200A between various positions. Each position in turn corresponds to a position of the shift rail of the first synchronizer assembly 30A (i.e., engaged left, engaged right, and neutral). A fork position sensor 210A may be included to communicate to the controller 32 the position of the shift fork 203A.

The second synchronizer actuator 190B includes a piston 200B slidably disposed within a piston housing or cylinder 202B. The piston 200B presents two separate areas for pressurized hydraulic fluid to act upon. The piston 200B engages or contacts a finger lever, shift fork, or other shift rail component 203B of the second synchronizer assembly 30B. The second synchronizer actuator 190B includes a fluid port 204B that communicates with a first end 205B of the piston 200B and a fluid port 206B that communicates with an opposite second end 207B of the piston 200B having a smaller contact area than the first end 205B. Fluid port 204B is in communication with the second synchronizer supply line 194 and fluid port 206B is in communication with the actuator supply line 180. Accordingly, the pressurized hydraulic fluid 102 communicated from the actuator pressure control device 140 enters the second synchronizer actuator 190B through the fluid port 206B and contacts the second end 207B of the piston 200B and the flow of hydraulic fluid 102 from the second flow control device 184 enters the second synchronizer actuator 190B through the fluid port 204B and contacts the first end 205B of the piston 200B. The difference in force generated by the pressure of the hydraulic fluid 102 delivered to fluid port 206B from the actuator pressure control device 140 acting on end 207B and the force generated by the pressure of the hydraulic fluid 102 delivered to fluid port 204B from the second flow control device 184 acting on end 205B moves the piston 200B between various positions. Each position in turn corresponds to a position of the shift rail of the second synchronizer assembly 30B (i.e., engaged left, engaged right, and neutral). A fork position sensor 210B may be included to communicate to the controller 32 the position of the shift fork 203B.

The third synchronizer actuator 190C includes a piston 200C slidably disposed within a piston housing or cylinder 202C. The piston 200C presents two separate areas for pressurized hydraulic fluid to act upon. The piston 200C engages or contacts a finger lever, shift fork, or other shift rail component 203C of the third synchronizer assembly 30C. The third synchronizer actuator 190C includes a fluid port 204C that communicates with a first end 205C of the piston 200C and a fluid port 206C that communicates with an opposite second end 207C of the piston 200C having a smaller contact area than the first end 205C. Fluid port 204C is in communication with the third synchronizer supply line 196 and fluid port 206C is in communication with the actuator supply line 180. Accordingly, the pressurized hydraulic fluid 102 communicated from the actuator pressure control device 140 enters the third synchronizer actuator 190C through the fluid port 206C and contacts the second end 207C of the piston 200C and the flow of hydraulic fluid 102 from the third flow control device 186 enters the third synchronizer actuator 190C through the fluid port 204C and contacts the first end 205C of the piston 200C. The difference in the force generated by the pressure of the hydraulic fluid 102 delivered to fluid port 206C from the actuator pressure control device 140 acting on end 207C and the force generated by the pressure of the hydraulic fluid 102 delivered to fluid port 204C from the third flow control device 186 acting on end 205C moves the piston 200C between various positions. Each position in turn corresponds to a position of the shift rail of the third synchronizer assembly 30C (i.e., engaged left, engaged right, and neutral). A fork position sensor 210C may be included to communicate to the controller 32 the position of the shift fork 203C.

The fourth synchronizer actuator 190D includes a piston 200D slidably disposed within a piston housing or cylinder 202D. The piston 200D presents two separate areas for pressurized hydraulic fluid to act upon. The piston 200D engages or contacts a finger lever, shift fork, or other shift rail component 203D of the fourth synchronizer assembly 30D. The fourth synchronizer actuator 190D includes a fluid port 204D that communicates with a first end 205D of the piston 200D and a fluid port 206D that communicates with an opposite second end 207D of the piston 200D having a smaller contact area than the first end 205D. Fluid port 204D is in communication with the fourth synchronizer supply line 198 and fluid port 206D is in communication with the actuator supply line 180. Accordingly, the pressurized hydraulic fluid 102 communicated from the actuator pressure control device 140 enters the fourth synchronizer actuator 190D through the fluid port 206D and contacts the second end 207D of the piston 200D and the flow of hydraulic fluid 102 from the fourth flow control device 188 enters the fourth synchronizer actuator 190D through the fluid port 204D and contacts the first end 205D of the piston 200D. The difference in the force generated by the pressure of the hydraulic fluid 102 delivered to fluid port 206D from the actuator pressure control device 140 acting on end 207D and the force generated by the pressure of the hydraulic fluid 102 delivered to fluid port 204D from the fourth flow control device 188 acting on 205D moves the piston 200D between various positions. Each position in turn corresponds to a position of the shift rail of the fourth synchronizer assembly 30D (i.e., engaged left, engaged right, and neutral). A fork position sensor 210D may be included to communicate to the controller 32 the position of the shift fork 203D.

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by first selectively actuating one of the synchronizer assemblies 30A-D and then selectively actuating one of the torque transmitting devices 22, 24. It should be appreciated that which actuator assembly 30A-D and which torque transmitting device 22, 24 provide which forward or reverse gear ratio may vary without departing from the scope of the present invention.

Generally, the actuator pressure control device 140 provides pressurized hydraulic fluid 102 to each of the synchronizer actuators 190A-D and each of the flow control devices 182, 184, 186, and 188. Individual synchronizer actuators 190A-D are actuated by controlling a flow from one of the flow control devices 182, 184, 186, and 188 while maintaining a flow from the remaining flow control devices to keep the unengaged synchronizer actuators in a neutral position.

For example, to actuate the first synchronizer assembly 30A, the actuator pressure control device 140 is energized to provide a pressure on the piston 200A and to provide a flow of hydraulic fluid 102 to the first flow control device 182. Bi-directional translation of the first synchronizer assembly 30A is then achieved by selectively energizing the first flow control device 182. For example, energizing the first flow control device 182 to provide a flow of hydraulic fluid 102 to the synchronizer actuator 190A which provides a pressure acting on the piston end 205A that is sufficient to overcome the force generated by the pressure acting on the piston end 207A from the actuator pressure control device 140 moves the piston 200A to a first engaged position. After controlling the piston back to neutral typically through closed loop position control, energizing the first flow control device 182 to provide a flow of hydraulic fluid 102 to the synchronizer actuator 190A which provides a pressure acting on the piston end 205A that is balanced with the force generated by the pressure acting on the piston end 207A from the actuator pressure control device 140 maintains the piston 200A in a neutral or unengaged position. Energizing or de-energizing the first flow control device 182 to provide a flow of hydraulic fluid 102 to the synchronizer actuator 190A which provides a pressure acting on the piston end 205A that is insufficient to overcome the force generated by the pressure acting on the piston end 207A from the actuator pressure control device 140 moves the piston 200A to a second engaged position.

To actuate the second synchronizer assembly 30B, the actuator pressure control device 140 is energized to provide a pressure on the piston 200B and to provide a flow of hydraulic fluid 102 to the second flow control device 184. Bi-directional translation of the second synchronizer assembly 30B is then achieved by selectively energizing the second flow control device 182. For example, energizing the second flow control device 184 to provide a flow of hydraulic fluid 102 to the synchronizer actuator 190B which provides a pressure acting on the piston end 205B that is sufficient to overcome the force generated by the pressure acting on the piston end 207B from the actuator pressure control device 140 moves the piston 200B to a first engaged position. After controlling the piston back to neutral typically through closed loop position control, energizing the second flow control device 184 to provide a flow of hydraulic fluid 102 to the synchronizer actuator 190B which provides a pressure acting on the piston end 205B that is balanced by the force generated by the pressure acting on the piston end 207B from the actuator pressure control device 140 maintains the piston 200B in a neutral or unengaged position. Energizing or de-energizing the second flow control device 184 to provide a flow of hydraulic fluid 102 to the synchronizer actuator 190B which provides a pressure acting on the piston end 205B that is insufficient to overcome the force generated by the pressure acting on the piston end 207B from the actuator pressure control device 140 moves the piston 200B to a second engaged position.

To actuate the third synchronizer assembly 30C, the actuator pressure control device 140 is energized to provide a pressure on the piston 200C and to provide a flow of hydraulic fluid 102 to the third flow control device 186. Bi-directional translation of the third synchronizer assembly 30C is then achieved by selectively energizing the third flow control device 186. For example, energizing the third flow control device 186 to provide a flow of hydraulic fluid 102 to the synchronizer actuator 190C which provides a pressure acting on the piston end 205C that is sufficient to overcome the force generated by the pressure acting on the piston end 207C from the actuator pressure control device 140 moves the piston 200C to a first engaged position. After controlling the piston back to neutral typically through closed loop position control, energizing the third flow control device 186 to provide a flow of hydraulic fluid 102 to the synchronizer actuator 190C which provides a pressure acting on the piston end 205C that is balanced by the force generated by the pressure acting on the piston end 207C from the actuator pressure control device 140 maintains the piston 200C in a neutral or unengaged position. Energizing or de-energizing the third flow control device 186 to provide a flow of hydraulic fluid 102 to the synchronizer actuator 190C which provides a pressure acting on the piston end 205C that is insufficient to overcome the force generated by the pressure acting on the piston end 207C from the actuator pressure control device 140 moves the piston 200C to a second engaged position.

To actuate the fourth synchronizer assembly 30D, the actuator pressure control device 140 is energized to provide a pressure on the piston 200D and to provide a flow of hydraulic fluid 102 to the fourth flow control device 188. Bi-directional translation of the fourth synchronizer assembly 30D is then achieved by selectively energizing the fourth flow control device 188. For example, energizing the fourth flow control device 188 to provide a flow of hydraulic fluid 102 to the synchronizer actuator 190D which provides a pressure acting on the piston end 205D that is sufficient to overcome the force generated by the pressure acting on the piston end 207D from the actuator pressure control device 140 moves the piston 200D to a fourth engaged position. After controlling the piston back to neutral typically through closed loop position control, energizing the fourth flow control device 188 to provide a flow of hydraulic fluid 102 to the synchronizer actuator 190D which provides a pressure acting on the piston end 205D that is balanced by the force generated by the pressure acting on the piston end 207D from the actuator pressure control device 140 maintains the piston 200D in a neutral or unengaged position. Energizing or de-energizing the fourth flow control device 188 to provide a flow of hydraulic fluid 102 to the synchronizer actuator 190D which provides a pressure acting on the piston end 205D that is insufficient to overcome the force generated by the pressure acting on the piston end 207D from the actuator pressure control device 140 moves the piston 200D to a second engaged position.

To engage or actuate the first torque transmitting device 22, the first clutch pressure control device 136 and the first clutch flow control device 144 are energized. To engage or actuate the second torque transmitting device 24, the second clutch pressure control device 138 and the second clutch flow control device 160 are energized. Typically the engagement is monitored and controlled with position sensors (not shown).

In an alternate embodiment of the present invention, the first and second flow control devices 144 and 160 are replaced with first and second pressure control devices (or a combination of flow and pressure control devices). The first and second pressure control devices are preferably electrically controlled variable force solenoids having internal closed loop pressure control. The pressure control solenoids are operable to vary the pressure acting on the clutch actuators 156 and 168 to engage and disengage the clutches 22 and 24.

In yet another alternate embodiment of the present invention, the first, second, third, and fourth flow control devices 182, 184, 186, and 188 are replaced with first, second, third, and fourth pressure control devices (or a combination of flow and pressure control devices). The first, second, third, and fourth pressure control devices are preferably electrically controlled variable force solenoids having internal closed loop pressure control. The pressure control solenoids are operable to vary the pressure acting on the synchronizer actuators 190A-D.

By providing flow control of the clutches 22 and 24 and/or the synchronizer assemblies 30A-D, the hydraulic control system 100 is operable to provide direct clutch position control, direct synchronizer actuator position control, and variable clutch and synchronizer actuator position control. At the same time, quick clutch response times are enabled, spin losses are reduced, and packaging space of the hydraulic control system 100 is reduced, all of which contributes to improved fuel economy and performance. The hydraulic control system 100 is also compatible with BAS/BAS+ hybrid systems. Finally, failure mode protection is enabled through pre-staged position control of the control devices 136, 138, 140, 144, 160, 182, 184, 186, and 188.

Referring further to FIGS. 3 through 7, the operation of the electro-hydraulic control system 100 (FIGS. 2A and 2B) for the dry dual clutch transmission 10 (FIG. 1) will be described. Recall, the electro-hydraulic control system 100 includes three main subsystems: an oil delivery subsystem 101, a clutch control subsystem 103, and a synchronizer control subsystem 105. The main components of the oil delivery subsystem 101 are the electrically-driven, fixed-displacement pump 106, the blow-off safety valve 116, the high pressure side filter 118 with a blow-off feature 120, the pump check ball arrangement 124, the pressure accumulator 130, and the pressure sensor 132.

The electrically-driven, fixed displacement pump 106 is employed to provide pressurized hydraulic fluid 102 to actuate clutches 22, 24 and the synchronizers 30A-D to make the transmission 10 shift. The pump 106 provides pressurized fluid independent of whether the engine is running, thereby keeping the clutches 22, 24 staged for quick response during engine start/stop maneuvers. The pump 106 is turned on when the pressure sensor 132 indicates that the accumulator 130 needs to be recharged and is turned off when full charge pressure is achieved. The pump 106 may also run at a fixed lower rpm to create a closed-loop pressure control during certain failsafe operation modes where a failed clutch solenoid could result in over pressurization of the clutch. The pump 106 can be turned on during shifting events where relatively large amounts of hydraulic volume are extracted from the accumulator 130. The pump 106 can also be turned on prior to the driver starting the engine to hydraulically charge the system before any shifting or drive-away is requested. This can be triggered by the opening of a door, unlocking of the car doors, or other means.

Figure 3:
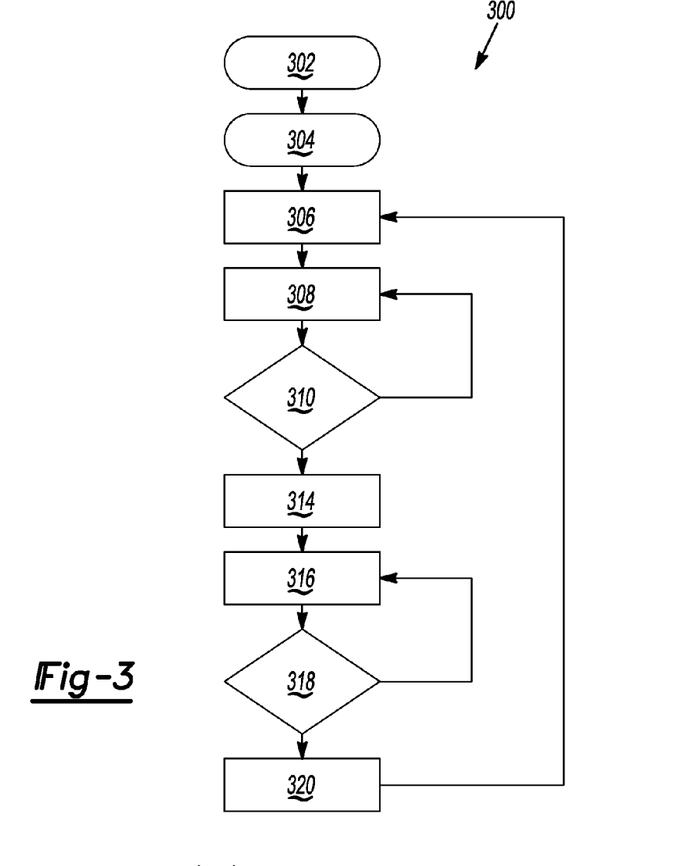
FIG. 3 is a flow diagram of a process for controlling an oil delivery subsystem of the hydraulic control system of FIGS. 2A and 2B in accordance with the principles of the present invention.

FIG. 3 shows a process 300 for controlling the oil delivery subsystem 101. Prior to initial charging of the hydraulic control system 100, the oil side of the accumulator 130 is depressurized in an initial start step 302. The accumulator piston is pushed by the gas charge pressure to the bottom of its respective bore, such that no reserve oil volume is employed by the transmission 10 for shifting. The pressure sensor 132 sends a signal to the TCM 32 (FIG. 1) to start the electric motor driving the pump 106 in a step 304. In a step 306, the pump 106 accelerates to a fixed rpm and begins displacing hydraulic fluid from the sump, out through the oil filter 118 and check ball arrangement 120, 124, and into the accumulator 130. This oil builds pressure and begins to push the accumulator piston against the gas charge. The relationship of pressure to displaced volume is governed by law of physics for gases. The pressure sensor 132 determines the system pressure (P) in a step 308.

Figure 4:
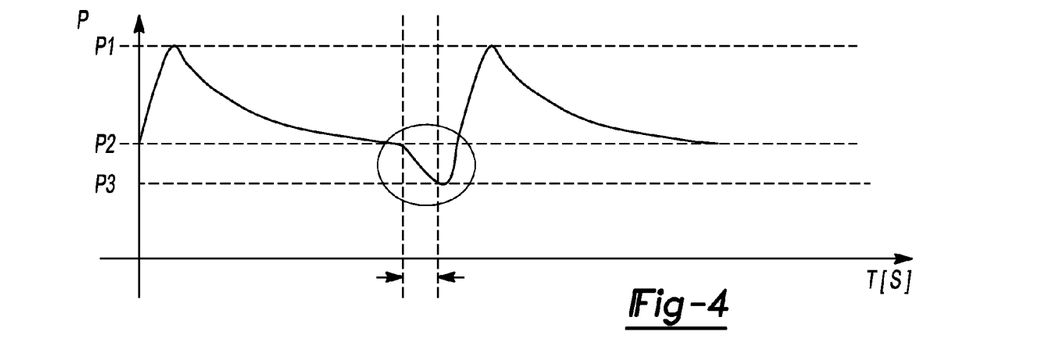
FIG. 4 is a diagram showing typical charge and discharge cycles of the oil delivery subsystem for accumulator pressure versus time.

Referring also to FIG. 4, which shows a typical charge and discharge cycle for accumulator pressure versus time, when the system pressure (P) reaches a predetermined value (P1) as reported by the pressure sensor 132 to the TCM 32 (step 310), the current to the electric pump 106 is shut off causing it to stop spinning in a step 314, and if P is less than P1, the process 300 returns to step 308. At this point oil wants to rush from the accumulator 130 back into the pump 106 but is prevented from doing so by the check ball arrangement 124 which seats and seals the pump 106 from the accumulator 130. With the check ball arrangement 124 seated, the only place for the accumulator oil to flow is to the rest of the subsystems 103 and 105 for clutch and synchronizer control. The leakage of these subsystems and oil volume used to stroke actuators makes the pressure in the accumulator 130 decrease over time. The pressure sensor 132 continues to monitor the system pressure (P) in a step 316, and once the pressure sensor 132 reports a pressure below a pre-determined recharge pressure P2 in a step 318, the pump 106 is commanded to turn to repeat the charge cycle (steps 320 and 306). The pre-determined restart or recharge pressure P2 is calculated as a function of temperature, gas charge pressure in the accumulator, pump output flow capabilities, and either learned or assumed leakage and stroke volumes to engage and neutralize forks and clutches. In particular, the pump restart or recharge pressure is determined by calculating the accumulator pressure level that will guaranty sufficient accumulator volume in reserve to accomplish a number of rapid shifting maneuvers. The reserve volume is the volume stored in the accumulator 130 between the recharge pressure P2 and a minimum pressure P3. The reserve volume required is a function of the number of shifts, the component volumes stroked, the shift times, the rate of system leakage, and the rate of pump output. Once the reserve volume is determined, the pump recharge pressure can be calculated according to the law of physics for gases. When the pump 106 is restarted at the recharge pressure P2, the worst case flow event (that is, supported shift) is protected against by the reserved volume stored in the accumulator 130.

The blow-off safety valve 116 is designed to unseat and limit the system pressure in the event that the pump 106 does not shut off at the right time because of a failed pump motor, a failed pressure sensor, or sluggish response. The designed blow-off pressure is slightly above the maximum expected system pressure. For example, if the maximum system pressure is 60 bar, the blow-off may be set at a nominal value of about 80 bar.

The oil delivery subsystem 101 supplies pressurized hydraulic fluid to the clutch control subsystem 103 to actuate the two clutches 22, 24. In this embodiment, the clutch control subsystem 103 includes two independent pressure control solenoids (PCS) 136, 138 fed by the oil delivery system 101. Each PCS 136, 138 feeds flow control solenoids (FCS) 144, 160, respectively, which in turn feed respective clutch piston assembly or actuators 152, 168. Each clutch actuator 152, 168 has a position sensor which relates the actuator's position back to the TCM 32 to be used in creating a clutch torque to position relationship. In this way the clutch torque is controlled using position as the independent variable.

Figure 5:
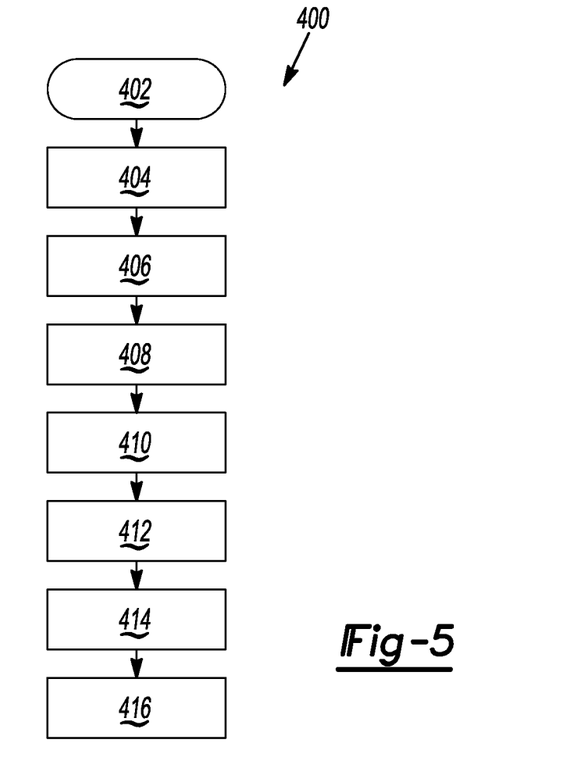
FIG. 5 is flow diagram of a process for controlling a clutch control subsystem of the hydraulic control system of FIGS. 2A and 2B in accordance with the principles of the present invention.

A process 400 for controlling the clutch control subsystem 103 is shown in FIG. 5. After starting the process 400 in a step 402, the required torque capacity is determined in a step 404, and the clutch torque to position relationship is determined in a step 406 as the transmission is operating by relating the reported engine torque while the clutch is slipping to the position reported by the clutch position sensor. This relationship, once learned, is used to provide a feed-forward control command while shifting. Closed-loop control is also used to fine tune the clutch torque shift profile.

The commanded pressure level of the PCSs 136, 138 is calculated from the higher of two pressure requirements. The first is the pressure level required to provide the requested amount of flow. The second is the pressure level required to hold the requested amount of clutch torque. As a note, in most cases the pressure level commanded is higher than the pressure required to maintain torque capacity, though it follows the trend of required clutch torque capacity. The pressure is higher because the flow control solenoids 144 and 160 prefer a constant pressure drop across the valve to obtain predictable flow rates through the valve. Once this pressure level is commanded in a step 408, it establishes one side of the pressure potential across the flow control solenoids 144, 160. The PCSs 136, 138 have a performance characteristic that relates regulated pressure to commanded electrical current. Once the commanded pressure is determined, the appropriate amount of current can be commanded in a step 410.

Each of the flow control solenoids 144, 160 can be thought of as a variable orifice. The solenoids 144, 160 have a relationship between valve flow area and electrical current. Once a pressure potential is supplied across the solenoid, the relationship becomes flow rate versus electrical current. These solenoids are capable of both positive (feed) flow and negative (exhaust) flow depending on the value of current commanded. The downstream side of the pressure potential across each solenoid 144, 160 is the clutch pressure. By knowing the position of the clutch 22 or 24 in a step 412, an estimate of clutch pressure can be made in a step 414. This is subtracted from the pressure command of a particular PCS to establish the pressure potential across the respective FCS. With the known pressure potential across the FCS, a predictable flow rate to current relationship can be used for commanding the FCS. The proper current can then be commanded on the FCS to produce the feed-forward component of the control flow in a step 416. Closed loop control is also used based on actual and commanded piston velocity and position to achieve the target clutch position.

If the clutch 22 or 24 is being engaged, flow is positive and larger currents are commanded. If the clutch 22 or 24 is being disengaged, flow is negative and lower currents are commanded. There is a region of current in the middle where the flow is deadheaded, and hence the FCS is neither feeding nor exhausting.

A spring loaded check ball arrangement 146, 162 may be provided in parallel to the FCSs 144, 160, respectively, to allow quick releases of the clutches 22, 24 or to release the clutch 22 or 24 in the event of a particular FCS sticking in the deadheaded region. The clutch is released through the check ball arrangement 146, 162 by reducing the PCS pressure below the clutch pressure level and check ball threshold.

In this particular embodiment, the even and odd clutch circuits are identical but independent. Each circuit's pressure level and flow rate can be independently commanded based on the specific shifting or staging needs of that clutch.

The synchronizer control subsystem 105 includes a single PCS 140, four flow control solenoids (FCSs) 182, 184, 186, 188, and four dual-acting fork actuators 190A, 190B, 190C, 190D, each with its own position sensor 210A, 210B, 210C, 210D, respectively. Each fork actuator is dual-acting; that is, it has a fully-engaged position to the left, a neutral position in the middle, and a fully engaged position to the right when referring to FIGS. 2A and 2B. For example, one actuator piston could engage the $3^{rd}$ gear synchronizer to the left and the $5^{th}$ gear to the right with a neutral position in the middle.

Figure 6:
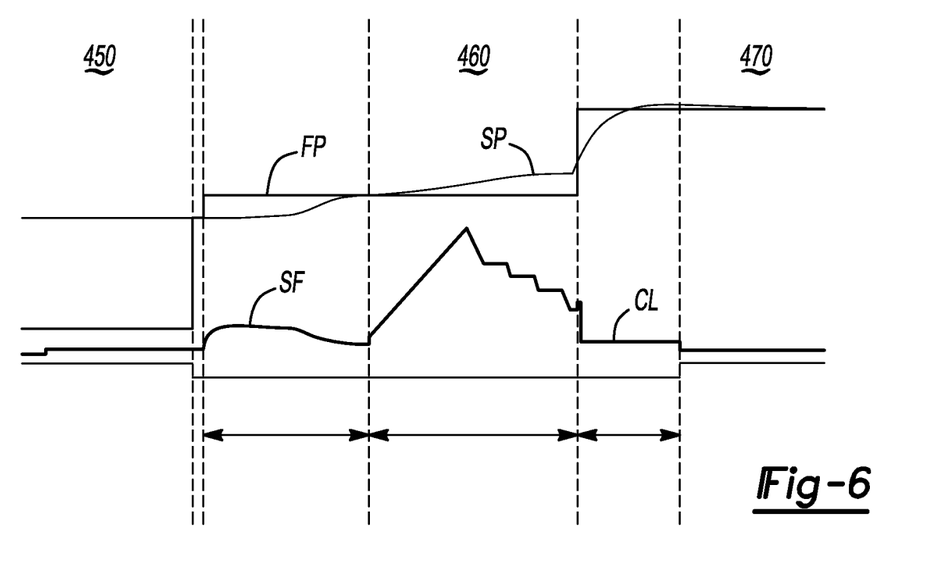
FIG. 6 is a diagram showing transient modes of a synchronizer of the transmission of FIG. 1.

Synchronizer modes include two steady-state modes and at least three transient modes. Steady-state modes include fully engaged and neutralized modes, and the transient modes include a pre-sync 450 mode, a synchronizing 460 mode, and a post-sync 470 mode, as shown in FIG. 6, with respect to the fork position command (FP), actual synchronizer position (SP), synchronizer force (SF), and closed-loop PID control (CL).

The output of the PCS 140 splits into eight parallel channels. Four of these channels feed the four FCSs 182, 184, 186, 188. The remaining four channels are directed to the appropriate fork actuators 190A, 190B, 190C, 190D. The output of each FCS 182, 184, 186, 188 is also routed to the appropriate fork actuator 190A, 190B, 190C, 190D, respectively. Each of the actuators 190A, 190B, 190C, 190D has an actuator piston 200A, 200B, 200C, 200D, respectively, with two opposing areas of different size. The larger area is connected to the output from a respective FCS 182, 184, 186, 188. The smaller area is connected the output from the PCS 140.

If the actuator 190A, 190B, 190C, or 190D is desired to move to the right, the PCS 140 is commanded to a pressure level and the respective FCS 182, 184, 186, or 188 is commanded to a position where it will feed PCS oil to the larger area of the actuator piston 200A, 200B, 200C, or 200D. Pressure builds up in the larger area, and eventually an equilibrium force is reached. Beyond this equilibrium force, the piston 200A, 200B, 200C, or 200D begins to move to the right against a detent spring load and PCS pressure force generated on the smaller opposing area. If the actuator is desired to move to the left, the PCS 140 is commanded to an appropriate pressure level and the FCS 182, 184, 186, or 188 is commanded to a position where it will exhaust the oil in the larger area of the actuator piston 200A, 200B, 200C, or 200D. As pressure drops in the larger area, eventually an equilibrium force is reached. Beyond this equilibrium force, the piston 200A, 200B, 200C, or 200D begins to move to the left because of the detent spring load and PCS pressure force generated on the smaller opposing area.

Figure 7A:
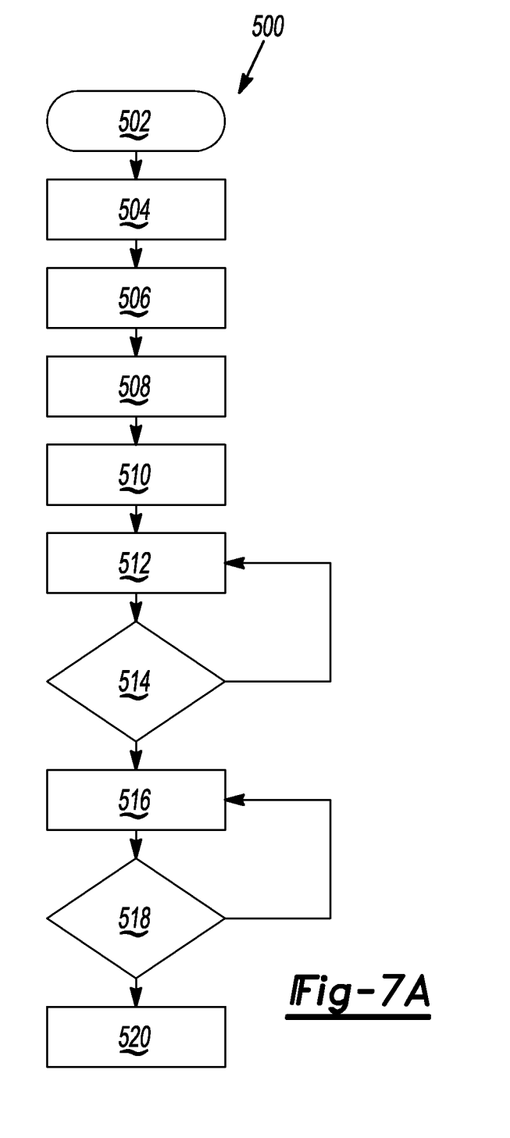
FIGS. 7A and 7B are flow diagrams of a process for controlling a synchronizer control subsystem of the hydraulic control system of FIGS. 2A and 2B in accordance with the principles of the present invention.

The command of the PCS pressure and FCS position is dependent on the mode of operation. Referring to FIG. 7A, a process 500 for operating the synchronizer control subsystem 105 is shown. After the process 500 commands a synchronizer engagement (step 502) of one or more of the synchronizers 30A, 30B, 30C, and 30D, the TCM 32 commands the branch controls to execute a pre-sync event in a step 504. This event includes moving the actuator piston 200A, 200B, 200C, or 200D and fork 203A, 203B, 203C, or 203D until the synchronizer sleeve contacts and indexes the blocker ring. The TCM 32 controls the synchronizer movement by use of closed-loop position and velocity feedback from the position sensor 210A, 210B, 210C, or 210D. In a step 506, the PCS 140 is commanded to a pressure level sufficient to provide the flow rate required and overcome the detent spring and piston drag. And also in the step 506, the FCS 182, 184, 186, or 188 is commanded to open to either feed or exhaust the larger area volume depending on the desired direction. These commands are adjusted as dictated by the closed-loop position control.

As the actuator piston 200A, 200B, 200C, or 200D approaches the learned position at which synchronization begins, the velocity of the piston is slowed to avoid a bump or clunk when synchronizer contact is made. Pressure from the PCS 140 is reduced in a step 508 in preparation for the beginning of the synchronization phase of the shift. Once the beginning of synchronization is signaled using position sensor 210A, 210B, 210C, or 210D and speed sensor feedback in a step 510, the FCS 182, 184, 186, or 188 is opened further in a step 512 so it is no longer the significant restriction in the circuit. This allows the controlling force on the piston to be just a function of the output of the PCS 140. If the desired synchronization force is to the right, the FCS 182, 184, 186, or 188 opens up to feed. This equalizes the pressure on both sides of the piston 200A, 200B, 200C, or 200D, but since the larger area provides a larger force than the smaller area, there is a net force to the right. If the desired synchronization force is to the left, the FCS 182, 184, 186, or 188 opens up to exhaust. This drops the pressure on the large side of the piston 200A, 200B, 200C, or 200D, but since the smaller area is still pressurized, there is a net force to the left.

The actuator force through the synchronization phase is ramped to provide a smooth speed change across the synchronizer 30A, 30B, 30C, or 30D without any clunks or bumps. As the synchronization nears the end, as determined in a decision step 514, the pressure is lowered in a step 516 in anticipation of the post-sync phase. In the post-sync phase, the blocker ring indexes and allow the sleeve to move through to full engagement with the gear. This is controlled with closed-loop position and velocity control. The velocity of the fork actuator 190A, 190B, 190C, or 190D is controlled to avoid a clunk when the sleeve contacts and stops on the gear. The control of the PCS 140 and FCS 182, 184, 186, 188 during post-sync phase is similar to the pre-sync phase where a pressure level is set with the PCS 140 and the FCS 182, 184, 186, 188 is opened to either feed or exhaust to control the velocity of the piston 200A, 200B, 200C, 200D.

Once full engagement is achieved as determined in a decision step 518, the PCS pressure drops to zero pressure as active control of the FCS 182, 184, 186, or 188 is maintained in a step 520. This ensures that the fork 203A, 203B, 203C, or 203D remains in full engagement. Back taper on the synchronizer teeth and the detent spring force hold the synchronizer 30A, 30B, 30C, or 30C in full engagement. Since changes in PCS pressure impart a force change on each of the four actuators 190A, 190B, 190C, 190D, the closed-loop position controls the FCSs 182, 184, 186, 188 at all times that the PCS 140 is active. This ensures that the forks 203A, 203B, 203C, 203D do not move out of their intended positions when a synchronizer movement is initiated.

Figure 7B:
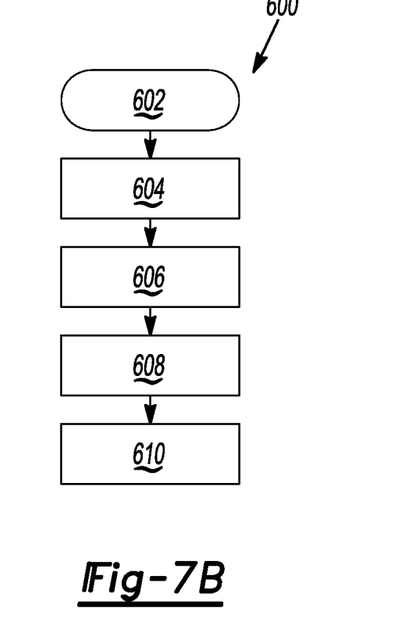

Referring now to FIG. 7B, a process 600 for disengaging the synchronizers 30A, 30B, 30C, 30D is shown. After the process 600 begins in a step 602, when disengaging the synchronizer 30A, 30B, 30C, or 30D from full engagement back to neutral, there is only a position and velocity controlled phase. The FCS 182, 184, 186, or 188 is opened either to feed or exhaust depending on the direction of the intended motion in a step 604. The PCS 140 is commanded to a pressure level required to generate the commanded flow across the FCS 182, 184, 186, or 188 in a step 606. At this point the FCS 182, 184, 186, or 188 is commanded to direct oil into or out of the large area chamber, forcing the respective piston 200A, 200B, 200C, or 200D to move. The position and velocity of the actuator piston 200A, 200B, 200C, or 200D is controlled via closed-loop control using the feedback of the position sensor 210A, 210B, 210C, or 210D. As the fork 203A, 203B, 203C, or 203D approaches the middle neutral position, the commanded velocity decreases. Once the position has reached a region near the learned neutral position, the PCS 140 is profiled off in a step 608 while still actively controlling the FCS 182, 184, 186, or 188. Once the pressure is exhausted on the actuator 190A, 190B, 190C, or 190D, the mechanical detent spring holds the actuator 190A, 190B, 190C, or 190D in the neutral position to disengage the respective synchronizer 30A, 30B, 30C, or 30D in a step 610. Again, since changes in PCS pressure impart a force change on each of the four actuators 190A, 190B, 190C, 190D, the closed-loop position controls the FCSs 182, 184, 186, 188 at all times that the PCS 140 is active. This ensures that the forks 203A, 203B, 203C, 203D do not move out of their intended positions when a synchronizer movement is initiated.

The description of the invention is merely exemplary in nature and variations that do not depart from the general essence of the invention are intended to be within the scope of the invention. Such variations are not to be regarded as a departure from the spirit and scope of the invention.

What is claimed is:

1. A method of controlling a dual clutch and a plurality of synchronizers in a transmission, the method comprising:
   selectively actuating the dual clutch with a first clutch actuator subsystem that is in downstream fluid communication with a source of pressurized hydraulic fluid;
   selectively actuating the dual clutch with a second clutch actuator subsystem that is in downstream fluid communication with the source of pressurized hydraulic fluid;
   controlling the pressure of the hydraulic fluid to the first and the second clutch actuator subsystems so that each clutch of the dual clutch engages with a desired torque; and
   actuating the plurality of synchronizers with a plurality of actuators, wherein each of the plurality of actuators is in downstream communication with a synchronizer pressure control solenoid and each of the plurality of actuators is in downstream communication with a respective one of first, second, third, and fourth synchronizer control solenoids, each of the first, second, third, and fourth synchronizer control solenoids being in downstream fluid communication with the synchronizer pressure control solenoid, and
   wherein each of the plurality of synchronizers is engaged by controlling the flow of hydraulic fluid from the first, second, third, and fourth synchronizer control solenoids to the plurality of actuators,
   wherein when pressure of the hydraulic fluid reaches a maximum value, the source of pressurized hydraulic fluid turns off to reduce the pressure of the hydraulic fluid, and when pressure of the hydraulic fluid falls below a predetermined recharge pressure value, the source of pressurized hydraulic fluid turns on to recharge the pressure of the hydraulic fluid, and
   wherein a reserve volume of hydraulic fluid is determined as a volume of hydraulic fluid stored in an accumulator when the pressure of the hydraulic fluid is between the predetermined recharge value and a minimum pressure value.

2. The method of claim 1 further comprising controlling the pressure of hydraulic fluid that is communicated to each of the first, second, third, and fourth synchronizer control solenoids and to each of the plurality of actuators with the synchronizer pressure control solenoid.

3. The method of claim 1 further comprising controlling the first, second, third, and fourth synchronizer control solenoids to control a flow of hydraulic fluid that is communicated from the synchronizer pressure control solenoid to the plurality of actuators.

4. The method of claim 1 wherein the synchronizer pressure control solenoid communicates with a first plurality of chambers in each of the plurality of actuators and each of the first, second, third, and fourth synchronizer control solenoids communicate with one of a second plurality of chambers in each of the plurality of actuators, wherein each of the first plurality of chambers is disposed on a side of a moveable member opposite the second plurality of chambers, and wherein the moveable members are interconnected to the synchronizers.

5. The method of claim 1 wherein the synchronizer pressure control solenoid includes an input in downstream fluid communication with the source of pressurized hydraulic fluid and an output, and wherein each of the first, second, third, and fourth synchronizer control solenoids include an input in downstream fluid communication with the output of the synchronizer pressure control solenoid and an output.

6. The method of claim 5 wherein the plurality of actuators includes a first, a second, a third, and a fourth actuator each having a first input and a second input, wherein the first inputs of the first, second, third, and fourth actuators are in downstream fluid communication with the output of the synchronizer pressure control solenoid, and wherein the second inputs of the first, second, third, and fourth actuators are each in downstream fluid communication with one of the outputs of the first, second, third, and fourth synchronizer control solenoids.

7. The method of claim 1 wherein actuating the first clutch actuator subsystem includes actuating a first clutch actuator in downstream fluid communication with a first clutch flow control solenoid, the first clutch flow control solenoid being in downstream fluid communication with a first clutch pressure control solenoid that is in downstream fluid communication with the source of hydraulic fluid, and wherein actuating the second clutch actuator subsystem includes actuating a second clutch actuator in downstream fluid communication with a second clutch flow control solenoid, the second clutch flow control solenoid being in downstream fluid communication with a second clutch pressure control solenoid that is in downstream fluid communication with the source of hydraulic fluid.

8. The method of claim 7 wherein controlling the pressure of the hydraulic fluid to the first and the second clutch actuator subsystems includes calculating a command pressure level for the first and the second clutch pressure control solenoids based on a clutch torque to actuator position relationship, estimating the clutch pressure of each clutch from the position of each clutch to establish a desired pressure potential across respective clutch flow control solenoids, and applying a command current to each clutch flow control solenoid such that each clutch of the dual clutch engages with the desired torque.

9. A method of controlling a dual clutch and a plurality of synchronizers in a transmission, the hydraulic control system comprising:
selectively actuating the dual clutch with a first clutch actuator subsystem that is in downstream fluid communication with a source of pressurized hydraulic fluid;
selectively actuating the dual clutch with a second clutch actuator subsystem that is in downstream fluid communication with the source of pressurized hydraulic fluid;
controlling the pressure of the hydraulic fluid to the first and the second clutch actuator subsystems so that each clutch of the dual clutch engages with a desired torque;
actuating one of the plurality of synchronizers with a first actuator that is in downstream fluid communication with a synchronizer pressure control solenoid and a first synchronizer control solenoid, the first actuator being engaged by selectively controlling a flow of hydraulic fluid from the first synchronizer control solenoid;
actuating one of the plurality of synchronizers with a second actuator that is in downstream fluid communication with the synchronizer pressure control solenoid and a second synchronizer control solenoid, the second actuator being engaged by selectively controlling a flow of hydraulic fluid from the second synchronizer control solenoid;
actuating one of the plurality of synchronizers with a third actuator that is in downstream fluid communication with the synchronizer pressure control solenoid and a third synchronizer control solenoid, the third actuator being engaged by selectively controlling a flow of hydraulic fluid from the third synchronizer control solenoid; and
actuating one of the plurality of synchronizers with a fourth actuator that is in downstream fluid communication with the synchronizer pressure control solenoid and a fourth synchronizer control solenoid, the fourth actuator being engaged by selectively controlling a flow of hydraulic fluid from the fourth synchronizer control solenoid,
wherein when pressure of the hydraulic fluid reaches a maximum value, the source of pressurized hydraulic fluid turns off to reduce the pressure of the hydraulic fluid, and when pressure of the hydraulic fluid falls below a predetermined recharge pressure value, the source of pressurized hydraulic fluid turns on to recharge the pressure of the hydraulic fluid, and
wherein a reserve volume of hydraulic fluid is determined as a volume of hydraulic fluid stored in an accumulator when the pressure of the hydraulic fluid is between the predetermined recharge value and a minimum pressure value.

10. The method claim 9 further comprising controlling the pressure of hydraulic fluid that is communicated to each of the first, second, third, and fourth actuators and each of the first, second, third, and fourth synchronizer control solenoids with the synchronizer pressure control solenoid.

11. The method of claim 9 further comprising controlling the first, second, third, and fourth synchronizer control solenoids to control a flow of hydraulic fluid that is communicated from the synchronizer pressure control solenoid to the first, second, third, and fourth actuators, respectively.

12. The method of claim 9 wherein the synchronizer pressure control solenoid includes an input in downstream fluid communication with the source of pressurized hydraulic fluid and an output, and wherein each of the first, second, third, and fourth synchronizer control solenoids include an input in downstream fluid communication with the output of the synchronizer pressure control solenoid and an output.

13. The method of claim 12 wherein the first, second, third, and fourth actuators each include a first input and a second input, wherein the first inputs of the first, second, third, and fourth actuators are in downstream fluid communication with the output of the synchronizer pressure control solenoid, and wherein the second inputs of the first, second, third, and fourth actuators are each in downstream fluid communication with one of the outputs of the first, second, third, and fourth synchronizer control solenoids, respectively.

14. The method of claim 9 wherein actuating the first clutch actuator subsystem includes actuating a first clutch actuator in downstream fluid communication with a first clutch flow control solenoid, the first clutch flow control solenoid being in downstream fluid communication with a first clutch pressure control solenoid that is in downstream fluid communication with the source of hydraulic fluid, and wherein actuating the second clutch actuator subsystem includes actuating a second clutch actuator in downstream fluid communication with a second clutch flow control solenoid, the second clutch flow control solenoid being in downstream fluid communication with a second clutch pressure control solenoid that is in downstream fluid communication with the source of hydraulic fluid.

15. The method of claim 14 wherein controlling the pressure of the hydraulic fluid to the first and the second clutch actuator subsystems includes calculating a command pressure level for the first and the second clutch pressure control solenoids based on a clutch torque to actuator position relationship, estimating the clutch pressure of each clutch from the position of each clutch to establish a desired pressure potential across respective clutch flow control solenoids, and applying a command current to each clutch flow control solenoid such that each clutch of the dual clutch engages with the desired torque.

16. A method of controlling a dual clutch and a plurality of synchronizers in a transmission, the method comprising:
   actuating the dual clutch with a first clutch actuator subsystem that is in downstream fluid communication with a source of pressurized hydraulic fluid;
   actuating the dual clutch with a second clutch actuator subsystem that is in downstream fluid communication with the source of hydraulic fluid;
   controlling the pressure of the hydraulic fluid to the first and the second clutch actuator subsystems so that each clutch of the dual clutch engages with a desired torque;
   commanding a synchronizer pressure control solenoid to a pressure level sufficient to provide a flow rate of a hydraulic fluid, the synchronizer pressure control solenoid being in downstream fluid communication the source of pressurized hydraulic fluid;
   commanding at least one of a first, second, third, and fourth synchronizer control solenoids to open, each of the first, second, third, and fourth synchronizer control solenoids being in downstream fluid communication with the synchronizer pressure control solenoid;
   reducing the pressure in the hydraulic fluid at the beginning of a synchronization phase of the plurality of synchronizers by opening a valve;
   opening further the at least one of the first, second, third, and fourth synchronizer control solenoids to selectively control the flow of hydraulic fluid to a respective actuator of a plurality of actuators, each actuator being in downstream fluid communication with respective synchronizer control solenoids and the synchronizer pressure control solenoid;
   controlling the movement of respective pistons for each of the plurality of actuators to a desired position with closed-loop position control so that a desired actuator force is achieved; and
   actuating the plurality of synchronizers with the plurality of actuators,
   wherein when pressure of the hydraulic fluid reaches a maximum value, the source of pressurized hydraulic fluid turns off to reduce the pressure of the hydraulic fluid, and when pressure of the hydraulic fluid falls below a predetermined recharge pressure value, the source of pressurized hydraulic fluid turns on to recharge the pressure of the hydraulic fluid, and
   wherein a reserve volume of hydraulic fluid is determined as a volume of hydraulic fluid stored in an accumulator when the pressure of the hydraulic fluid is between the predetermined recharge value and a minimum pressure value.

17. The method of claim 16 further comprising reducing the pressure of the hydraulic fluid in the plurality of synchronizer solenoids to about zero when a desired gear of the transmission is engaged.

18. The method of claim 16 wherein actuating the first clutch actuator subsystem includes actuating a first clutch actuator in downstream fluid communication with a first clutch flow control solenoid, the first clutch flow control solenoid being in downstream fluid communication with a first clutch pressure control solenoid that is in downstream fluid communication with the source of hydraulic fluid, and wherein actuating the second clutch actuator subsystem includes actuating a second clutch actuator in downstream fluid communication with a second clutch flow control solenoid, the second clutch flow control solenoid being in downstream fluid communication with a second clutch pressure control solenoid that is in downstream fluid communication with the source of hydraulic fluid.

19. The method of claim 18 wherein controlling the pressure of the hydraulic fluid to the first and the second clutch actuator subsystems includes calculating a command pressure level for the first and the second clutch pressure control solenoids based on a clutch torque to actuator position relationship, estimating the clutch pressure of each clutch from the position of each clutch to establish a desired pressure potential across respective clutch flow control solenoids, and applying a command current to each clutch flow control solenoid such that each clutch of the dual clutch engages with the desired torque.

* * * * *